(12) United States Patent
Repela et al.

(10) Patent No.: US 11,390,132 B2
(45) Date of Patent: Jul. 19, 2022

(54) SUSPENSION CONTROL VALVE ARRANGEMENT FOR A PNEUMATIC SUSPENSION SYSTEM OF A COMMERCIAL VEHICLE

(71) Applicant: WABCO Europe BVBA, Brussels (BE)

(72) Inventors: Marek Repela, Wroclaw (PL); Przemyslaw Zak, Wroclaw (PL)

(73) Assignee: WABCO Europe BVBA, Brussels (BE)

( * ) Notice: Subject to any disclaimer, the term of this patent is extended or adjusted under 35 U.S.C. 154(b) by 0 days.

(21) Appl. No.: 17/143,223

(22) Filed: Jan. 7, 2021

(65) Prior Publication Data

US 2021/0206224 A1 Jul. 8, 2021

(30) Foreign Application Priority Data

Jan. 8, 2020 (EP) ...................................... 20150809

(51) Int. Cl.
 *B60G 17/052* (2006.01)
(52) U.S. Cl.
 CPC .... *B60G 17/0525* (2013.01); *B60G 2202/152* (2013.01); *B60G 2500/202* (2013.01)
(58) Field of Classification Search
 CPC .......... B60G 17/0525; B60G 2202/152; B60G 2500/202; B60G 2500/2021;
(Continued)

(56) References Cited

U.S. PATENT DOCUMENTS

| 5,176,404 A | * | 1/1993 | Sulzyc | ................... | B60G 17/00 |
| | | | | | 137/102 |
| 7,028,996 B2 | | 4/2006 | Plath | | |

(Continued)

FOREIGN PATENT DOCUMENTS

| DE | 2658552 A1 | 6/1978 |
| DE | 4329432 C1 | 4/1995 |

(Continued)

OTHER PUBLICATIONS

Sulcyz Georg, 'Machine Translation of EP 1310388 Obtained Dec. 21, 2021', May 14, 2003, Entire Document. (Year: 2003).*

*Primary Examiner* — James A English
*Assistant Examiner* — Scott F. Underwood
(74) *Attorney, Agent, or Firm* — Dickinson Wright PLLC (57) ABSTRACT

A suspension control valve arrangement for a pneumatic suspension system of a commercial vehicle includes a supply port, a delivery port, an exhaust port, a service valve arrangement, and an operation control mechanism (5, 6) for switching the service valve arrangement into one of the following normal operation modes of a normal operation status: a blocking position for a blocking mode for blocking an air supply from the supply port to the delivery port, a supply position for a supply mode for supplying air from the supply port to the delivery port, or an exhaust position for a normal exhaust mode for connecting the delivery port to the exhaust port. A dump-control device (7, 11) in the housing (2) is configured for switching between the normal operation status and a quick-dump mode (IV), win which the delivery port is connected to the exhaust port by bypassing the service valve arrangement.

17 Claims, 8 Drawing Sheets

(58) Field of Classification Search
CPC ........ B60G 2500/2022; B60G 2500/30; B60G 2300/026
See application file for complete search history.

(56) References Cited

U.S. PATENT DOCUMENTS

| | | | | |
|---|---|---|---|---|
| 7,810,827 | B2* | 10/2010 | Sheehan | B60G 17/0528 280/124.16 |
| 2002/0171219 | A1* | 11/2002 | Sorum | B60G 17/0528 280/124.16 |
| 2003/0111810 | A1* | 6/2003 | Fulton | B60G 17/0526 280/86.5 |
| 2009/0033055 | A1* | 2/2009 | Morris | B60G 17/0155 280/124.16 |
| 2009/0261551 | A1* | 10/2009 | Legros | B60G 11/27 280/124.1 |
| 2010/0213397 | A1* | 8/2010 | Trudeau | B60G 17/0525 251/129.01 |
| 2011/0175317 | A1* | 7/2011 | Legros | B60G 11/27 280/124.157 |
| 2015/0367704 | A1* | 12/2015 | Chua | B60G 17/0521 280/6.157 |
| 2017/0361674 | A1* | 12/2017 | Ahmadian | B60G 21/005 |
| 2018/0319239 | A1* | 11/2018 | Repela | B60G 17/056 |
| 2019/0039431 | A1* | 2/2019 | Vaughan | B60G 21/026 |

FOREIGN PATENT DOCUMENTS

| | | | | |
|---|---|---|---|---|
| DE | 3716436 | A1 | 12/1998 | |
| DE | 10240357 | A1 * | 3/2004 | ......... B60G 17/0523 |
| DE | 102011121756 | A1 | 6/2013 | |
| EP | 0556086 | A1 | 8/1993 | |
| EP | 1310388 | A2 | 5/2003 | |
| EP | 2806194 | A1 * | 11/2014 | .......... F16K 11/0743 |
| EP | 2824372 | A1 * | 1/2015 | .......... F16K 11/0743 |
| WO | WO-2013143566 | A1 * | 10/2013 | ............ F15B 21/048 |
| WO | WO-2019215046 | A1 * | 11/2019 | ......... B60G 17/0165 |

* cited by examiner

SUSPENSION CONTROL VALVE ARRANGEMENT FOR A PNEUMATIC SUSPENSION SYSTEM OF A COMMERCIAL VEHICLE

TECHNICAL FIELD

The invention relates to a suspension control valve arrangement for use in a pneumatic suspension system of a commercial vehicle. Furthermore, the invention relates to a pneumatic suspension system of a commercial vehicle and a commercial vehicle comprising such a pneumatic suspension system.

BACKGROUND

Pneumatic suspension systems in commercial vehicles in general comprise air bellows at the vehicle axles, in particular one air bellows at each wheel, in order to adjust the axle height and the damping characteristics, in particularly in dependence of a load measurement or height measurement. The suspension system in general comprises a suspension valve arrangement with three valve positions for enabling the following operation modes: A supply mode for supplying the air bellows with air for lifting the axle, an exhaust mode for exhausting or venting the air bellows for lowering the axle and a blocking mode for blocking the air in the bellows for keeping the stored air volume constant. Thus a suspension valve arrangement or levelling valve arrangement for a height control of an axle can be realised with a 3/3-way valve comprising a supply position, an exhaust position and a blocking position.

EP 556 086 B1 and EP 1 310 388 B1 disclose suspension valve systems with plate-like valve elements, which can be realised by ceramic plates. Two plate-like elements comprise conduits, grooves and holes and can be rotatably displaced with respect to one another for forming different air passages in different rotation positions. The ceramic plates are biased against each other by a spring and can be in contact without further sealing elements, thereby enabling a displacement via a manually operable handle, e.g. a lever, by the operator with low resistance.

However, the air flow realisable by such a valve design is limited. Such a limitation of the flow is helpful for adjusting specific height levels; however, in some situations a quick venting or quick exhausting of the air bellows is desired.

DE 37 16 436 C2 and DE 43 29 432 C1 disclose levelling valves with height limitation and an additional pneumatic valve for a quick release or quick venting of the air bellows. However, the additional hardware needed leads to higher costs and additional plumbing.

SUMMARY

A goal of the invention is to realise a suspension control valve arrangement which can be made with little effort and high reliability.

The present disclosure introduces a suspension control valve arrangement, a pneumatic suspension system comprising this suspension control valve arrangement and a commercial vehicle with such a pneumatic suspension system.

According to the invention a service valve arrangement is provided for realising a normal operation status configured for selecting one the three normal operation modes of air supply, air blocking and exhausting; further a dump-control device is provided to allow switching between the normal operation status and a quick-dump mode, in which the service valve arrangement is bypassed, thereby enabling a quick exhaust or a quick dump with a higher exhaust volume rate.

The service valve arrangement is switchable into three valve positions, i.e. a supply position, a blocking position and a normal exhaust position, in which valve positions the ports of the housing—the supply port, delivery port and exhaust port—are interconnectable with each other in order to realise the three normal operation modes. In the quick-dump mode, however, the delivery port is connected with the exhaust port without limitation by the valve channels or valve conduits, thereby allowing higher exhaust volume rates.

According to a preferred embodiment, the dump-control device is realised by a displaceable control piston, which is in particular linearly displaceable between two positions. In this case, the control piston is employed in connection with an "ordinary" service valve, that is, a service valve without a dump-control device, to provide the service valve arrangement. Especially, the displaceable control piston may be employed in connection with a standard, prior-art, possibly readily available service valve. The piston can be slidably provided in e.g. a sleeve inserted into the housing, wherein a space between a circumferential piston surface and the housing or the sleeve is separated into two or more piston chambers. This separation can be realised by e.g. a sealing means provided in an axial direction between the piston chambers. The piston chambers connect the valve ports of the ordinary service valve; thus the displacement of the control piston results in a displacement of the piston chambers with respect to the valve ports of the service valve, thereby blocking the service valve in the quick-dump mode. Furthermore, in the quick-dump mode an exhaust air passage between the exhaust port and the delivery port of the housing is unblocked or released, thereby bypassing the blocked service valve. The exhaust air passage in the housing for this quick-dump mode is preferably designed with a higher cross-section than the internal valve passages.

Thus a first piston chamber around the control piston is preferably part of the internal valve passages of the service valve arrangement, in particular part of an internal valve delivery channel, and a displacement of the control piston and its sealing means thus blocks a connection between the valve delivery port and either the valve supply port or the valve exhaust port.

The design with an ordinary service valve and the control piston for switching between a normal operation status and a quick-dump mode offers several advantages, in particular a compact design, wherein the additional hardware for the control piston is relatively small. Furthermore, such a control piston enables a high reliability and an easy operability, in particular a manual operability. In particular, the integration of a piston chamber into the internal valve passages is advantageous.

The service valve arrangement can, in particular, be realised by plate-like valve parts, in particular ceramic plates, being pressed against each other and comprising channels, grooves and/or through-holes, thereby forming the internal valve passages. By rotating the valve parts with respect to each other, these through-holes, grooves and/or channels are brought into different connection positions, thereby realising the different valve positions or valve functions of the ordinary service valve. Valve arrangements with rotatable plate-like valve parts, which form internal valve passages for different valve positions of e.g. a 3/3-way valve, are in general known from e.g. EP 1 310 388 B1 and EP 556 086 B1; however, according to the invention the internal valve passages preferably include a piston chamber formed by the displaceable control piston, in order to realise a blocking of the service valve in the quick-dump mode.

In particular, the inventive combination of piston chambers formed by a control piston with a plate-valve arrangement of two plate-like elements comprising through-holes and conduits enables a compact and reliable design in a common housing. Preferably, the housing comprises an elongated part for the control piston arrangement, e.g. with the control piston, the sleeve for guiding the control piston and a biasing spring. The service valve preferably comprises a rotation axis which is perpendicular to the symmetry axis and displacement axis of the control piston. The plate-like elements are preferably provided adjacent to the piston chamber surrounding the control piston. Thus, a compact design with a common housing is provided. Advantageously, a lid for covering the service valve and bearing the valve shaft is fixed to the housing.

The actuation of the service valve arrangement can preferably be realised by a manually operable device, i.e. a handle, in particular a lever, for rotating an operation shaft provided between the lever and the rotatable valve plate. Thus, the operator can turn the lever with little effort. The dump control can be realised either manually, in particular with a push button or another manually operable actuation means, or with an auxiliary force. As an auxiliary force, a pneumatic port for receiving a pneumatic control signal can be implemented, in particular for displacing the control piston against its bias spring.

The suspension control valve arrangement is in particular provided for a dumping function of both air bellows of a vehicle axle, in particular a rear axle of the vehicle. Thus the axle can be lowered very quickly, for example for releasing a trailer, which is fixed to the coupling heads provided at the rear side of the commercial vehicle.

According to a preferred embodiment, the two delivery ports for the two air bellows are connected with each other within the housing. In order to avoid an asymmetric filling of the air bellows, a throttle can be provided between the supply port and the delivery connection of the delivery ports. Such a throttle is preferably provided in the first piston chamber, which realises the air passage or air connection between the supply valve port and the delivery valve port. Thus an asymmetric hardware design is possible, in which the valve supply port, e.g. a passage or through-hole in the ceramic plates facing the piston chamber, is provided at e.g. a top side of the piston chamber and the delivery ports in the housing are positioned with different distances to this valve supply port. The provision of a throttle helps to equalise the supply air stream and pressure from the supply valve port before it reaches the delivery ports; furthermore, the normal exhaust stream from the delivery ports to the common exhaust can be equalized by this throttle or another throttle.

The throttle can in particular be provided in the first piston chamber connecting the valve ports or at the valve plates; hereby the exhaust air passage of the dump function is not affected by this throttle function, since the aim of the dump function is to realise a quick dump or quick release, in particular for a complete air release of the air bellows, wherein an asymmetric release is not problematic for such a quick-dump function.

Thus, the invention enables a compact design, in particular with a housing which can be made as a metal diecast, with additional equipment like a lid, for covering and bearing the lever arrangement, and a cap or end cover for securing the piston arrangement.

The invention is hereinafter described in detail with reference to the appended drawings. The drawings are provided herewith for purely illustrative purposes and are not intended to limit the scope of the present invention.

BRIEF DESCRIPTION OF THE DRAWINGS

In the drawings,

FIG. 13 *a*) shows a top view onto the ceramic plates of the service valve in the supply mode II; and FIG. 13 *b*) shows a horizontal sectional view in the supply mode II.

DETAILED DESCRIPTION OF THE DRAWINGS

Figure 1:
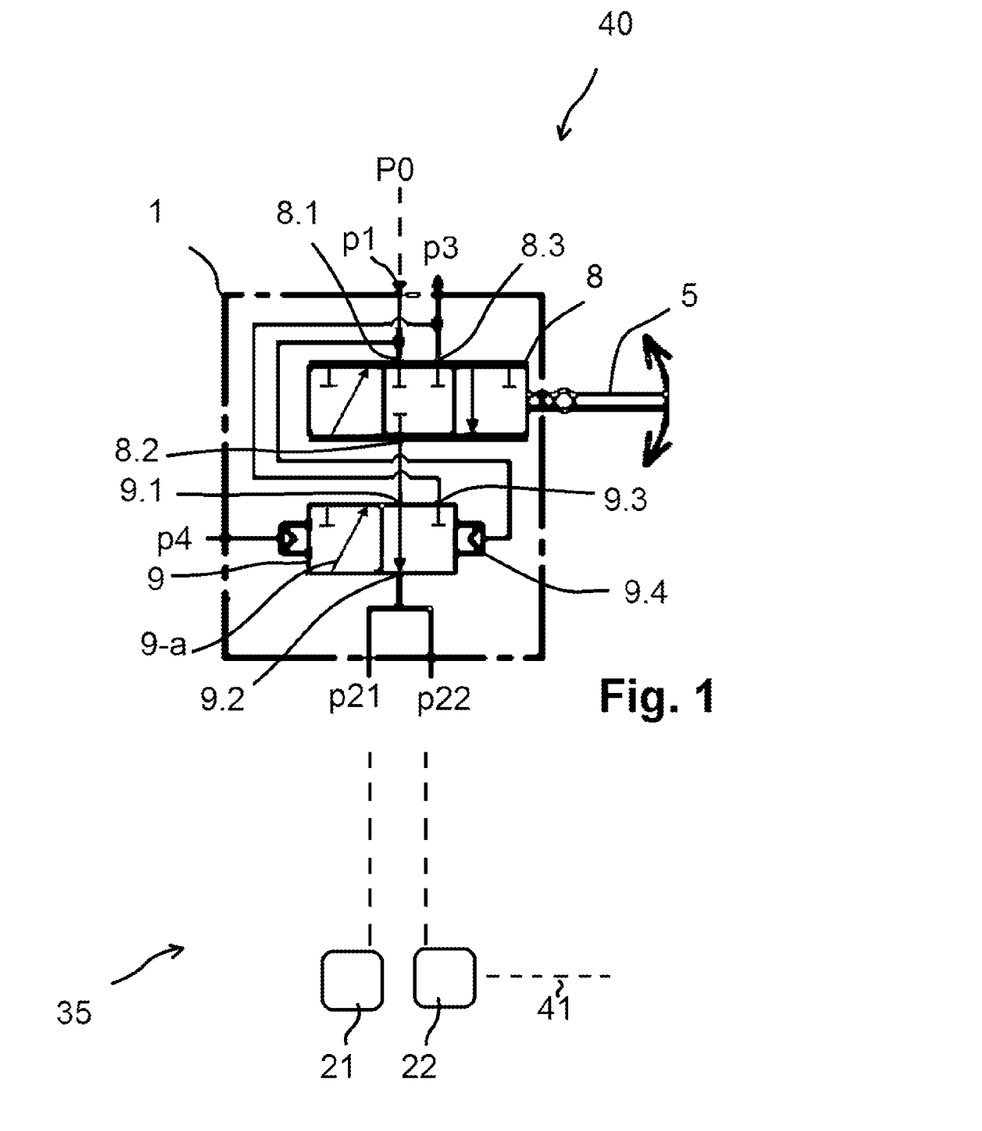
FIG. 1 shows a diagram of the suspension control valve arrangement.
Figure 2:
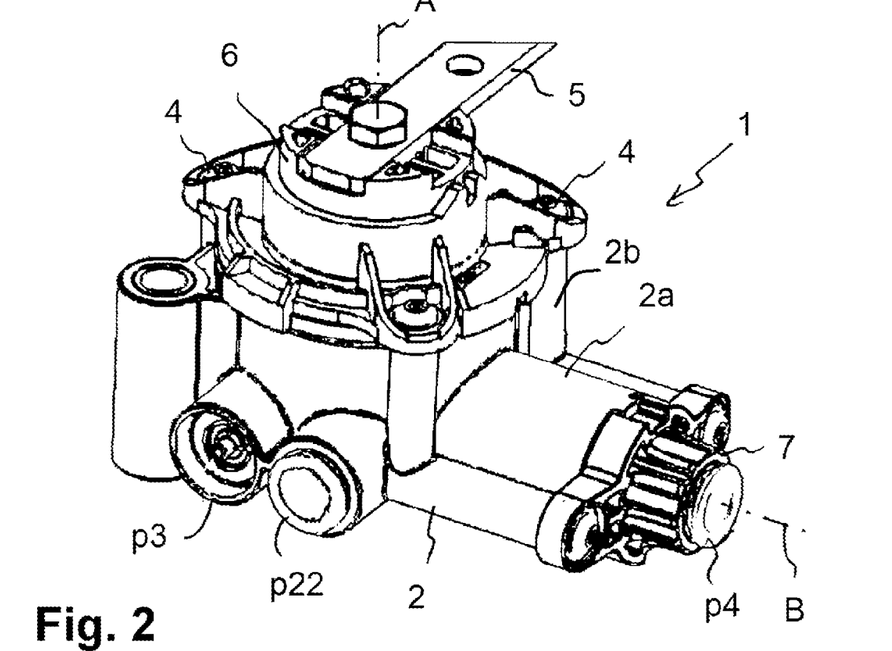
FIGS. 2 and 3 show perspective views of an embodiment of the suspension control valve arrangement.
Figure 3:
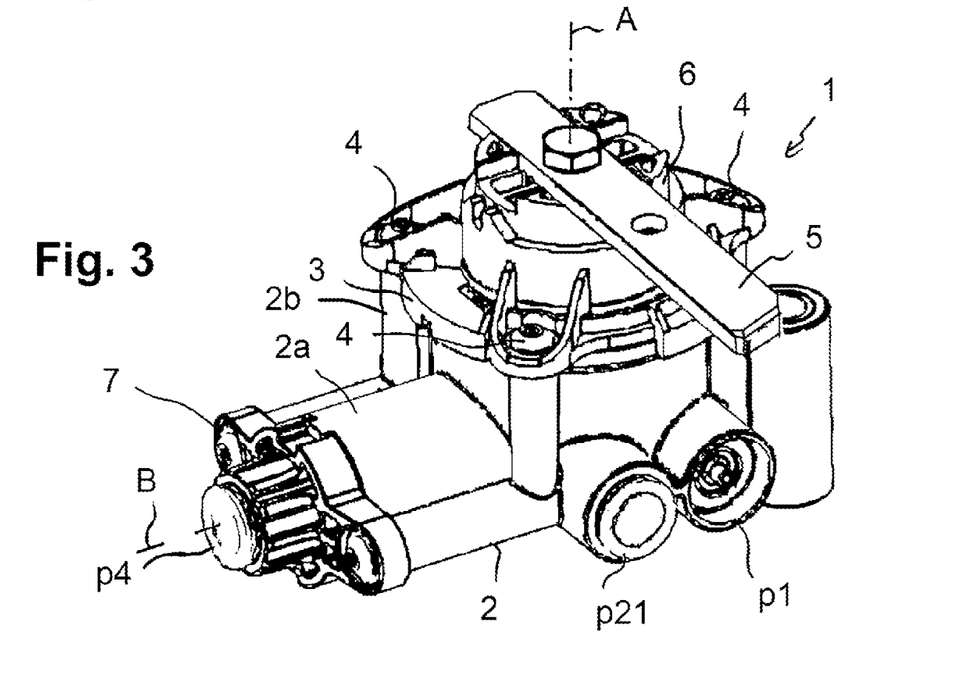

FIG. 1 is a diagram showing in a very schematic way a suspension control valve arrangement 1 according to an embodiment of the invention and its valve functions. The control valve arrangement 1 includes the following elements: a service valve system with a 3/3-way service valve 8; a lever 5 for selecting one of three valve positions of the service valve 8 in an normal operation status NO; and a 3/2-way dump valve 9 for switching between the normal operation status NO and a quick-dump mode.

Further, the control valve arrangement 1 includes a supply port p1 to be connected to a system pressure P0; a first delivery port p21 to be connected to a first suspension bellows (air bellows) 21 of a rear axle 41 of a commercial vehicle 40; a second delivery port p22 to be connected to a second suspension bellows (air bellows) 22 of the rear axle 41 of the commercial vehicle 40; and an exhaust port p3.

The 3/3-way service valve 8 comprises a supply valve port (first valve port) 8.1 connected to the supply port p1, a delivery valve port 8.2 (second valve port) connected to a dump valve supply port 9.1 of the 3/2-way dump valve 9 and an exhaust valve port (third valve port) 8.3 connected to the exhaust port p3 of the valve arrangement 1. The operator can handle the lever 5 and switch the service valve 8 into one of its three valve positions.

The 3/2-way dump valve 9 further comprises a dump valve delivery port 9.2 connected to both delivery ports p21 and p22 of the valve arrangement 1, a dump valve exhaust port 9.3 connected to the exhaust port p3 of the valve arrangement 1, and a first control port 9.4 and a second control port or pilot dump port p4: The first control port 9.4 is realised as pneumatic control port and connected to the supply port p1 of the valve arrangement 1. The pilot dump port p4 is counter-acting against the first control port 9.4 in order to switch the dump valve 9 from the depicted open basic position, in which the dump valve supply port 9.1 and the dump valve delivery port 9.2 are connected, into its activated dump position or exhaust dump position for realising the quick-dump function, in which the delivery ports p21 and p22 are connected via the exhaust port 9.3 of the dump valve 9 with the exhaust port p3 of the valve arrangement 1, thereby circumventing or bypassing the service valve 8. The basic position of the dump valve 9 defines a normal operation status NO, in which the operator can adjust the normal operation mode I, II or II by turning the lever 5; in its activated position the dump valve 9 enables a quick-dump mode (or quick-exhaust mode) IV for a quick release of the bellows 21 and 22.

In the depicted basic position the 3/2-way dump valve 9 is in its open position, since supply pressure P0 connected to the supply port p1 acts onto its first control port 9.4 thereby securing its open basic position according to FIG. 1. In this position, the dump valve 9 is functionally equal to a simple air passage or air line between the valve port 8.2 and the delivery ports p21 and p22. Thus the operator can handle the lever 5, in particular by rotating or turning it, and choose one of the three valve positions of the service valve 8:

a blocking position SI for a blocking mode I, in which the delivery ports p21 and p22 are disconnected from the ports p1 and p3;

a supply position SII for a supply mode II, in which the ports 8.1 and 8.2 are connected for supplying the air bellows 21 and 22 with air and hereby lifting the axle 41; or an exhaust position SIII for a normal exhaust mode III, in which the ports 8.2 and 8.3 are connected, thereby blocking the first port 8.1. Thus a normal exhaust or venting of the bellows 21 and 22 via the valve channels of the service valve 8 is possible in order to lower the rear axle 41.

However, in the quick-dump mode IV, the dump valve 9 is displaced in its activated position by the pilot dump port p4, thereby blocking the valve delivery port 8.2 and connecting the delivery ports 21 and 22 with the exhaust port p3 via a dump valve passage 9-a of the dump valve 9, thereby bypassing the service valve 8. The dump valve passage 9-a and/or an air passage between the dump valve 9 and the exhaust port p3 comprises a larger cross-section than the internal valve exhaust channel of the service valve 8, for a quick venting of the connected suspension bellows 21 and 22.

FIGS. 2 to 12 show a hardware embodiment of the suspension control valve arrangement 1, which comprises in particular a housing 2 made e.g. by die-casting of metal, a lid 3 fixed onto the housing 2 by e.g. four screws 4, the lever 5 to be pivoted by the operator for selecting one of three normal operation modes I, II, and III in the normal operation status NO and an operation control shaft 6 to be driven by the lever 5. The operation control shaft 6 is pivotably inserted into the lid 3 and/or the housing 2 and displaces the 3/3-way service valve 8, which is described in detail below. The housing 2 comprises the supply port p1, the first delivery port p21 and the second delivery port p22, the exhaust port p3 and the pilot dump port p4, as described above with respect to FIG. 1. The ports p1, p21, and p22, p4 are provided in pipe fittings formed in the housing 2; the pilot dump port p4 is in particular provided in an end cover 7 screwed onto an elongated part of the housing 2. The pilot dump port p4 can according to different embodiments enable a mechanical control or a pneumatic control input; therefore the end cover 7 can be realised in different ways.

The dump valve 9 of FIG. 1 is preferably realized by a dump-control piston 10, a sleeve 12 guiding the dump-control piston 10 and a bias spring 11 for biasing the dump-control piston 10; however, a biasing of the dump-control piston 10 is in particular realized by the supply pressure P0 connected to the supply port p1, see FIG. 1.

The housing 2 comprises in particular an elongated part 2a for guiding the dump-control piston 10. The left part of the dump-control piston 10 is preferably guided in the elongated part 2a of the housing 2 and the end cover (cap) 7. The dump-control piston 10 comprises a piston head (control end) 10a, which is guided in the sleeve 12 sealingly inserted into the housing 2. The piston head 10a and the sleeve 12 define a first piston chamber 20 and a second piston chamber 30, as will be described below.

In the normal operation status NO the control piston 10 does not move; the control of the normal operation modes I, II, and III is only realised by turning of the lever 5, which is fixed to the operation control shaft 6, which again then displaces the service valve 8.

The service valve 8 is realised in particular by two ceramic plates 14 and 15 comprising plate grooves and plate bores for a defined, limited air stream.

The two ceramic plates 14 and 15 are rotatable, pivotable or turnable relatively to each other. In particular, the first ceramic plate 14 is the lower or bottom one and fixed to the housing 2, i.e. a fixed ceramic plate 14; the second ceramic plate is the upper or top ceramic plate 15 and turnable (or movable) by the operation control shaft 6. Preferably, the fixed ceramic plate 14 comprises through-holes, which are referred to as fixed through-holes 14-1, extending through the fixed ceramic plate 14 into the piston chamber 20 or 30 beneath the fixed ceramic plate 14. For example three fixed through-holes 14-1a, 14-1b, and 14-1c can be provided for realising the valve functions. Furthermore, the fixed ceramic plate 14 preferably comprises first grooves 14-2 extending in the fixed ceramic plate 14, in particular on one of its surfaces.

Preferably, the movable ceramic plate 15 comprises through-holes, which are referred to as displaceable through-holes 15-1, extending through the movable ceramic plate 15, e.g. three displaceable through-holes 15-1a, 15-1b, and 15-1c. Further, the movable ceramic plate 15 preferably comprises displaceable grooves 15-2 extending in the movable ceramic plate 15, in particular on one of its surfaces.

The operation control shaft 6 is fixed to the moveable ceramic valve plate 15, which is rotatably or pivotably provided on the first fixed ceramic valve plate 14. The relative position of the through-holes 14-1 and 15-1 and the grooves 14-2 and 15-2 thus define the three valve positions depicted in the block diagram of FIG. 1.

The housing 2 comprises an operation mode selecting part 2b for covering the ceramic valve plates 14 and 15, the operation control shaft 6 and a plate fixing spring 16, which presses the ceramic valve plates 14 and 15 onto each other for biasing. The plate fixing spring 16 is not actuated, i.e. not released or compressed during the switching processes between the operation modes I, II, and III; the ceramic valve plates 14 and 15 slide onto each other in their horizontal plane, which is perpendicular to the common rotation axis A of the lever 5, the operation control shaft 6, and the moveable ceramic valve plate 15.

Figure 4:
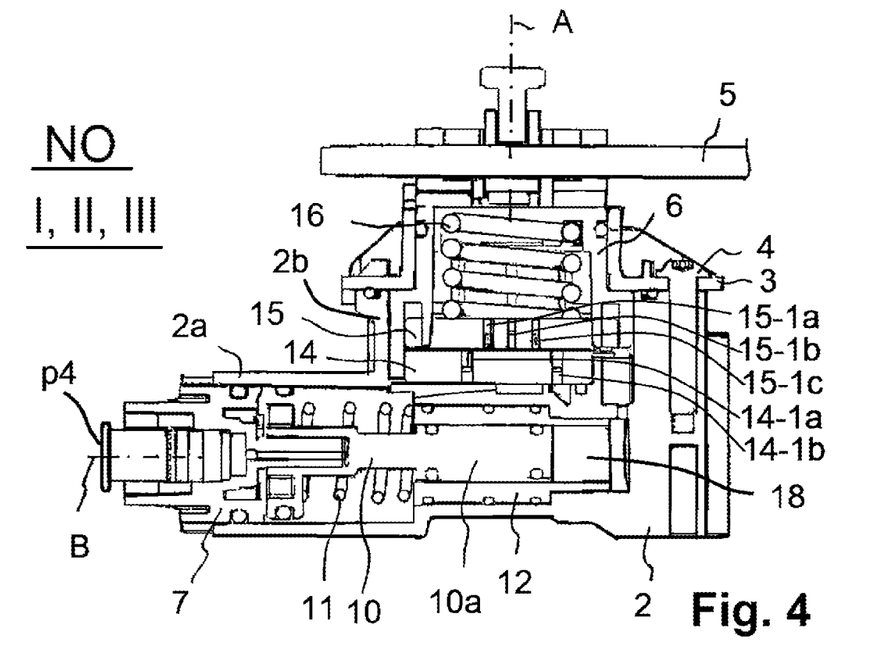
FIG. 4 shows a cross-sectional view of the suspension control valve arrangement in its normal operating status NO.
Figure 5:
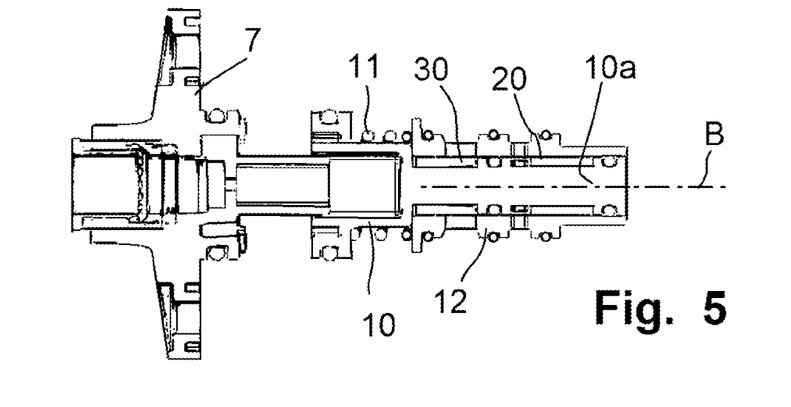
FIGS. 5 and 6 show cross-sectional views of the operation piston in FIG. 7.
Figure 6:
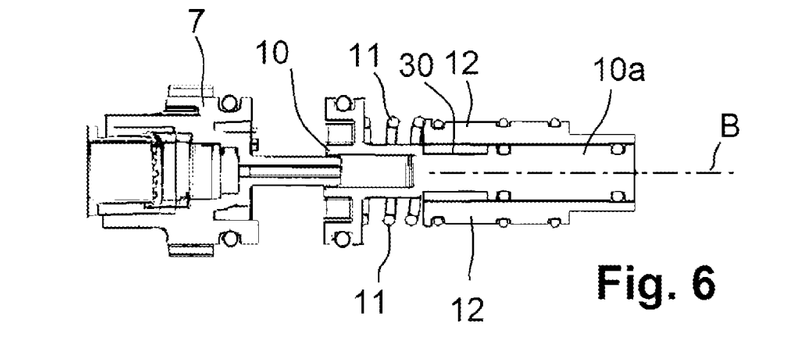
Figure 7:
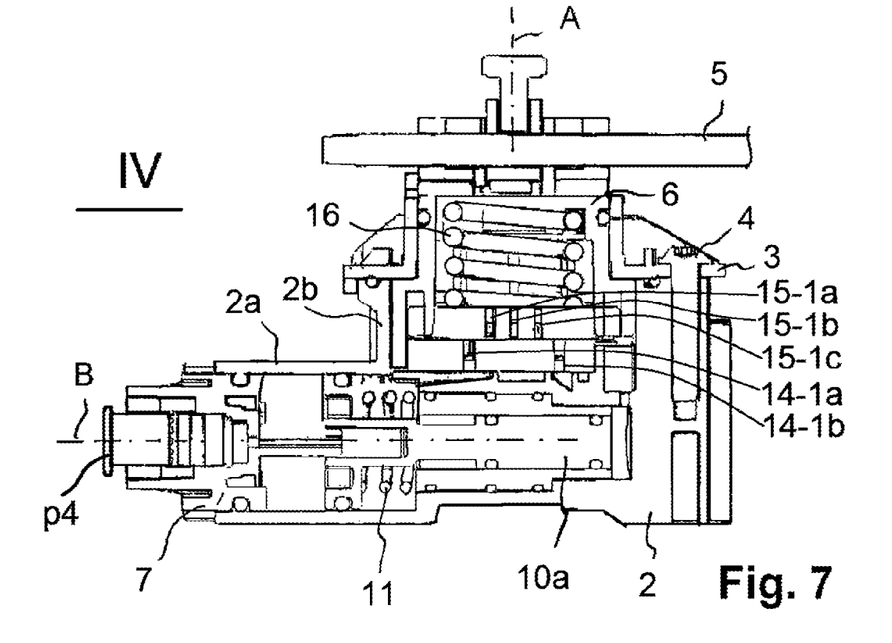
FIG. 7 shows a cross-sectional view of the suspension control valve arrangement in its quick-dump mode IV.
Figure 8:
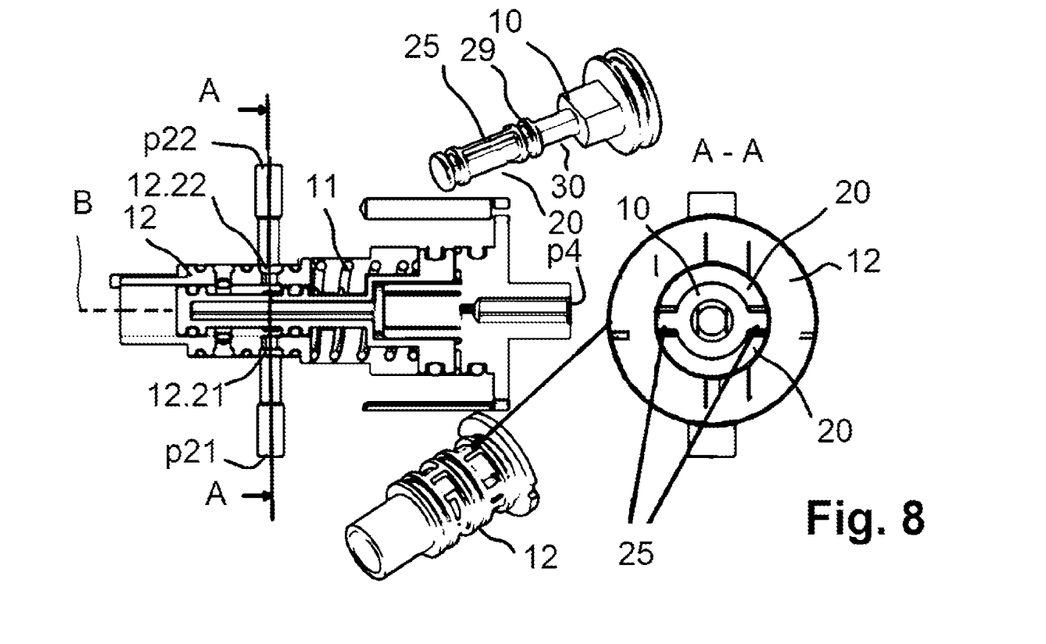
FIG. 8 shows the piston and sleeve of the dump-control device in different views.
Figure 9:
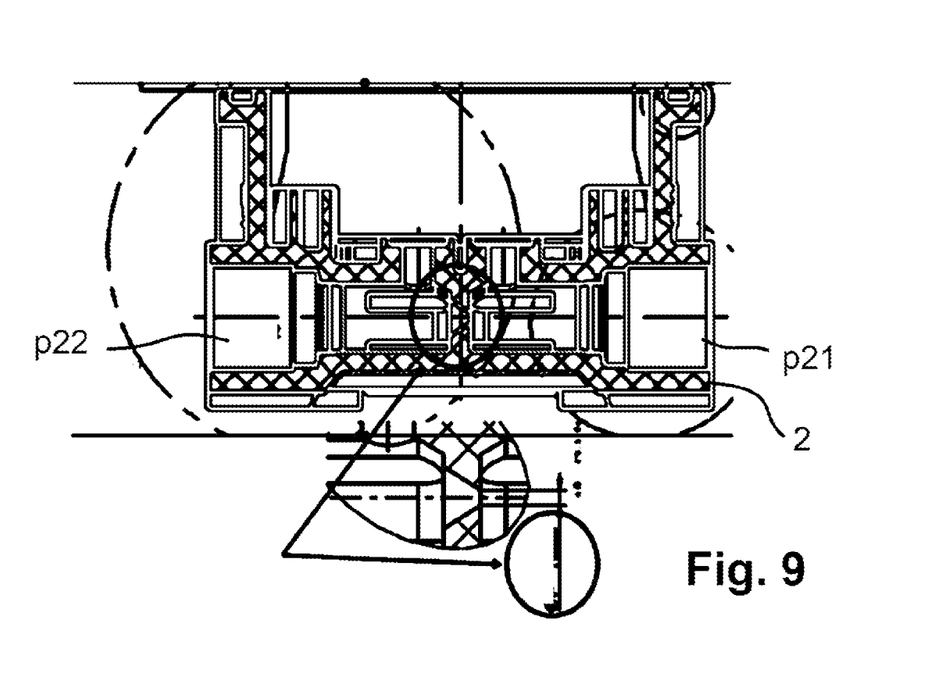
FIG. 9 shows a cross-sectional view of the throttle formation between the delivery ports.
Figure 10:
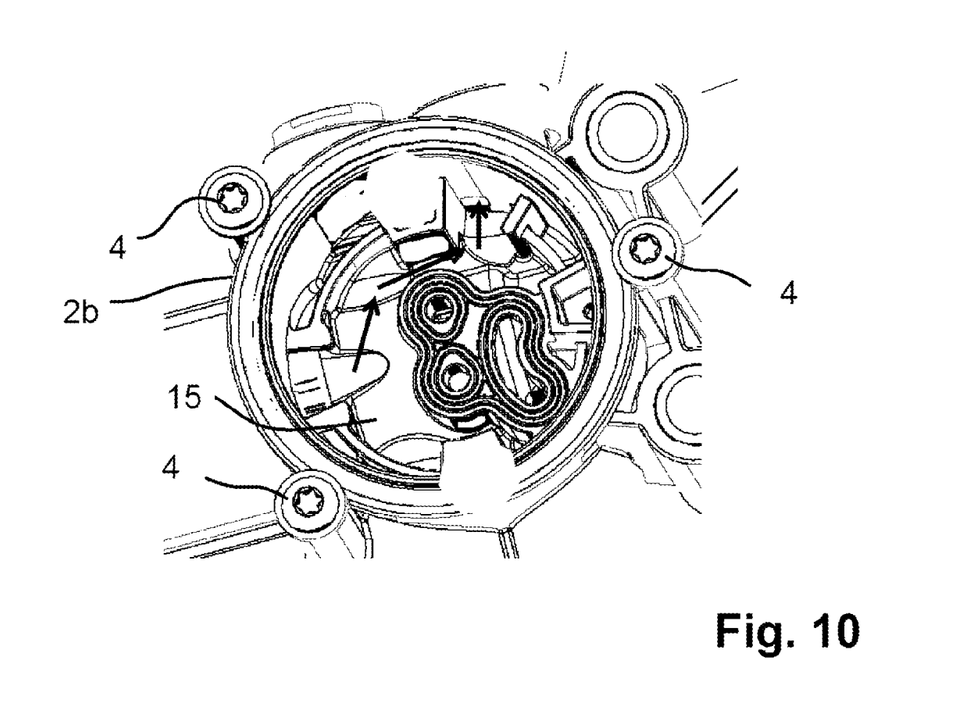
FIG. 10 shows a top view onto the opening of the housing with the exhaust air passage during normal operation mode.
Figure 11:
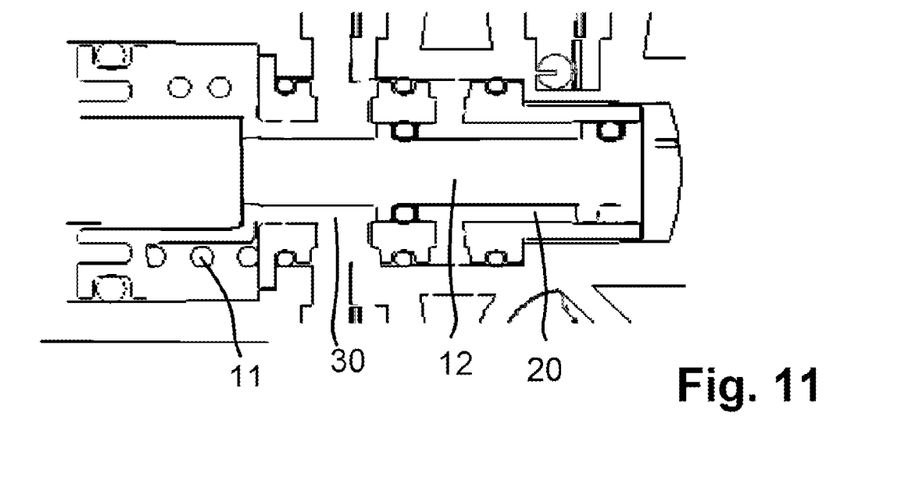
FIG. 11 shows a horizontal section of the piston valve arrangement with the exhaust of air during dump-function activation.
Figure 12:
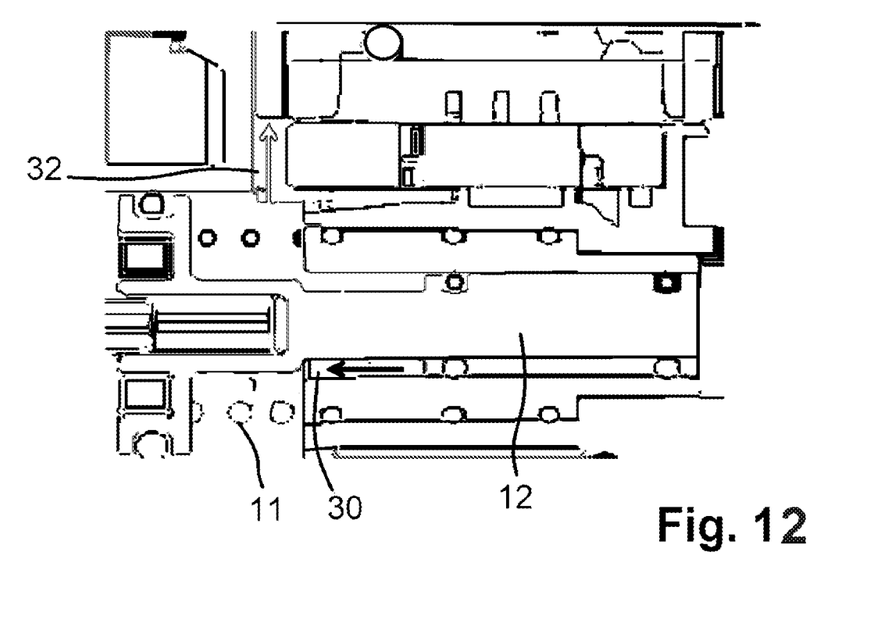
FIG. 12 shows a vertical section according to FIG. 11.

As can be seen from FIG. 4, the operation mode selecting part 2b and the lid 3 together can be provided for covering and supporting the operation control shaft 6, the ceramic valve plates 14 and 15 and the plate fixing spring 16.

In the normal operation modes I, II, and III, the air stream is limited by the cross-sections of the plate grooves and plate bores of the service valve 8; even in the normal exhaust mode III the volume rate for lowering the chassis by venting the suspension bellows connected to the delivery ports p21 and p22 is limited, thereby enabling the adjustment of suspension heights and specific suspension pressures.

In the supply mode II supply air with supply pressure P0 is fed to the supply port p1 from an air supply, e.g. an air reservoir or air tank. The supply port p1 is preferably realised as a cylindrical reception, e.g. a socket or fitting in the housing 2, for receiving a pneumatic pipe. Afterwards the supply air passes through an air passage provided in the housing 2 to the supply valve port 8.1 as depicted in FIG. 1. This supply valve port 8.1 is preferably provided at the upper, movable ceramic plate 15.

The subsequent air stream is then defined by the positions of the ceramic plates 14 and 15, i.e. the turning position or rotation position of the moveable ceramic valve plate 15 on the fixed ceramic valve plate 14. In the blocking mode I, the air stream is blocked, since the through-holes 14-1 and 15-1 are not connected to one another by direct alignment or via grooves 14-2 and 15-2 in the ceramic plates 14 and 15.

Figure 13:
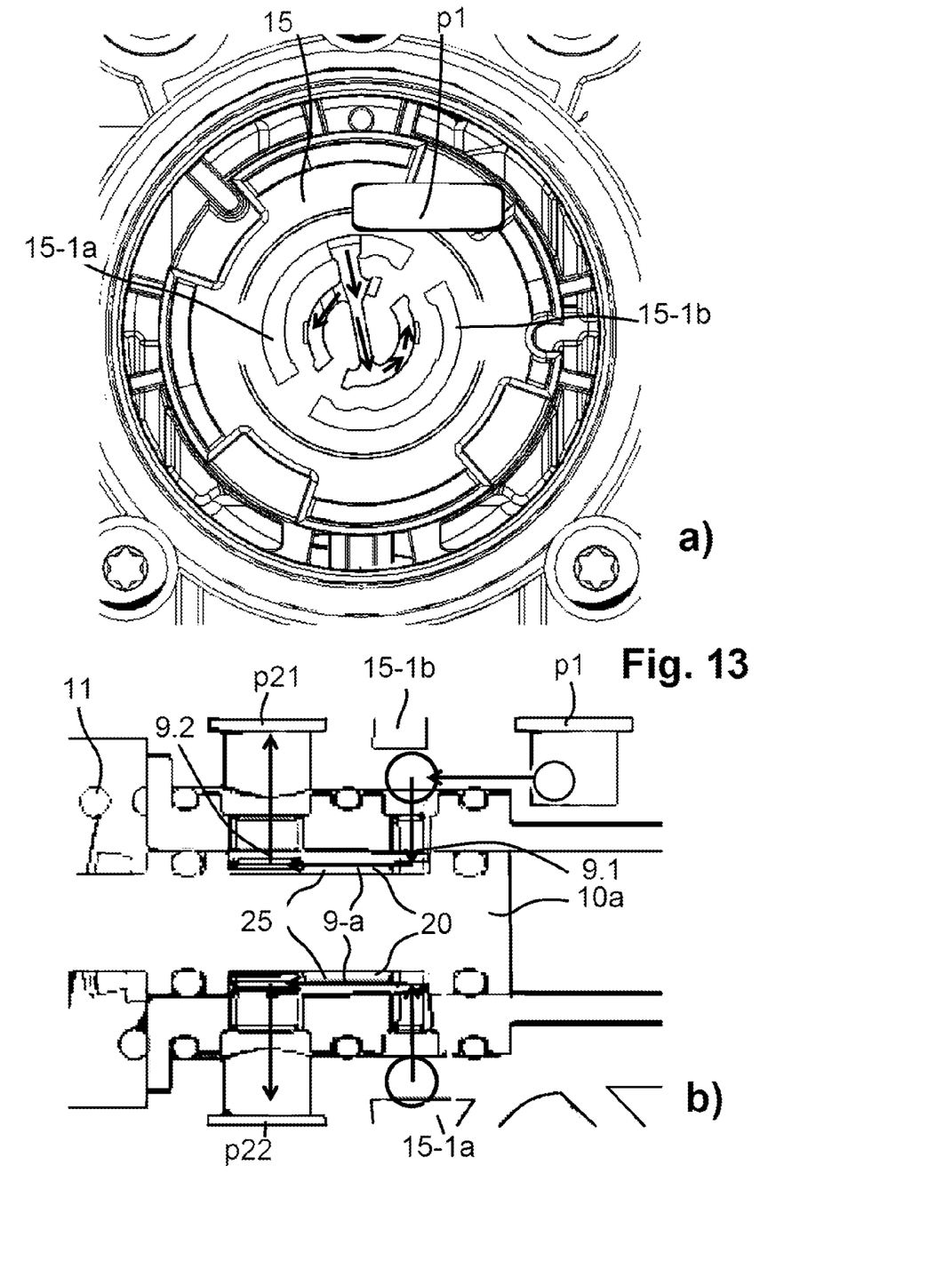

By turning the lever 5 and thereby the operation control shaft 6 and the moveable ceramic valve plate 15 into the supply mode II, an air passage through both ceramic plates 14 and 15 is realised, as is indicated in FIG. 13. The supply air then enters the dump valve supply port 9.1 of the dump valve 9 and flows through a circumferential space around the control piston 10, which defines a first piston chamber 20 between the control piston 10, in particular its piston head (control end) 10a, and the sleeve 12, to an opening in the sleeve 12 and the housing 2, which serves as dump valve delivery port 9.2. Thus the piston chamber 20 serves as a dump valve passage 9-a according to the block diagram of FIG. 1.

The axial position of the first piston chamber 20 depends on the position of the control piston 10; in the normal operation status NO, which enables the normal operation modes I, II, and III, this axial position of the first piston chamber 20 is fixed and therefore the connections of the air passages in the ceramic plates 14 and 15 only depend on the relative tilting position or rotational position of the moveable ceramic valve plate 15 with respect to the fixed valve plate 14. Thus the air flows through a first sleeve port 12.1 into the piston chamber 20, then in axial direction (symmetry axis B) through the first piston chamber 20 to sleeve delivery ports 12.21 and 12.22 in the sleeve 12, and then in radial direction to the delivery ports p21 and p22.

According to a preferred embodiment, a throttle 24 is provided, in particular in the dump valve passage 9-a of the dump valve 9. The throttle 24 can be realised by any kind of obstacle or flow resistance in the cross section of the first piston chamber 20, for reducing the air stream from the dump valve supply port 9.1 to the first delivery port p21 and the second delivery port p22, but allowing a larger air stream between these delivery ports p21 and p22, see e.g. FIG. 13. The delivery ports p21 and p22 are preferably connected in circumferential direction in the first piston chamber 20, which connection therefore comprises a large cross-section.

The throttle 24 equalizes the pressure and helps to avoid e.g. the air supplied to the dump valve supply port 9.1 flowing predominantly to one of the delivery ports p21 and p22, since such asymmetric air flow could lead to a higher supply pressure at e.g. the first delivery port p21 and thereby at the first suspension bellows 21. Thus, the pressure equalization by the throttle 24 helps to avoid a sudden pressure increase at one side of the rear axle 41. The throttle 24 can in particular be realised by throttle ribs 25 provided at the circumferential face of the control piston 12 in the first piston chamber 20. The throttle ribs 25 thus extend parallel to the symmetry axis B. The throttle ribs 25 are preferably provided facing the sleeve ports 12.1, 12.21, and 12.22 in the sleeve 12. Thus the rib spaces 26 formed between the throttle ribs 25 are provided with an angular offset with respect to the ports 12.1, 12.21, and 12.22. The air therefore streams along these rib spaces 26 in symmetry direction B to a position in-between the ports 12.21 and 12.22, and from this position in circumferential direction to both sleeve port 12.21 and 12.22, with the same volume rate.

By turning or tilting the lever 5, the moveable ceramic plate 15 is turned with respect to the fixed ceramic plate 14, thereby reaching the exhaust position for realising the normal exhaust mode III. The moveable ceramic valve plate 15 now blocks an air stream from the supply port p1; however, the exhaust port p3 is no more blocked, and the delivery ports p21 and p22 in the housing 2 connected to the sleeve ports 12.21 and 12.22 are now connected via the ceramic plates 14 and 15 with the sleeve exhaust port 12.3 which is connected to the exhaust port p3. Thus again the first piston chamber 20 is used to realise the exhaust valve position of the service valve 8 in the diagram of FIG. 1. Thus, the three normal operation modes I, II, and III can be realised by air passages provided in the ceramic plates 14 and 15 and the first piston chamber 20, which in this basic position or normal operation position of the control piston 12 connects the sleeve ports 12.1, 12.3, 12.21, and 12.22 provided in the sleeve 12.

By displacing the control piston 12 against the bias of the control bias spring 11 into the dump position, the situation according to FIGS. 7 and 10 to 13 is reached, in which the delivery ports p21 and p22 are connected to the exhaust port p3 by bypassing the service valve 8, which is realised by the ceramic plates 14 and 15. The sleeve 12 is fixed in the housing 2 and therefore the sleeve ports 12.1, 12.3, 12.21, and 12.22 are not moved; however, the first piston chamber 20 and a second piston chamber 30 surrounding the control piston 10 are displaced together with the control piston 10. The second piston chamber 30 is separated from the first piston chamber 20 in axial direction by a piston sealing 29 between the piston chambers 20 and 30. In the actuated position of the control piston 10, the second piston chamber 30 connects the sleeve ports 12.21 and 12.22 in the sleeve 12 with an exhaust passage 32, which is provided in the housing 2 and extends to the exhaust port p3.

Thus, the delivery ports p21 and p22 are connected via the sleeve 12 and the additional exhaust passage 32 to the exhaust port p3. The supply port p1 is still connected to the first piston chamber 20, which is separated from the second piston chamber by the piston sealing 29, thereby blocking a connection between the supply port p1 and the delivery ports p21 and p22.

The sleeve exhaust port 12.3 is preferably not used in this dump function.

The cross-section of the exhaust air passage 32 is significantly larger than the cross-section of the bores and grooves in the ceramic plates 14 and 15, which realise the above-described exhaust connection in the normal exhaust mode III, and therefore the quick-dump mode IV enables a quick venting, i.e. a bleeding or de-aerating, of the connected suspension bellows 21 and 22. This quick-exhausting might not be realised symmetrically with respect to the suspension bellows 21 and 22; however, a quick-dump function enables a venting in a very short time and therefore, any time differences with respect to the suspension bellows 21 and 22 are not relevant.

The control piston 10 can be pushed manually by the operator, for example with a handle or a push button at the control piston 12. Alternatively, the control piston 10 may be controlled pneumatically, which pressure activation can be realised by connecting an air pipe or air tube to the pilot dump port p4. The biasing into the basic normal operation position NO for the normal operation modes I, II, and III can be realised by the supply pressure P0 acting onto the pilot dump port p4 (see FIG. 1); therefore the head face at the piston head 10, i.e. the end face of the control piston 10, can be exposed to the supply pressure P0 via a biasing pressure passage in the housing 2 between the supply port p1 and e.g. a space between the piston 10 and the sleeve 12 or the housing. Furthermore, the control bias spring 11 can be provided to enable a return to the basic normal position when the supply pressure P0 is vented.

LIST OF REFERENCE NUMERALS (PART OF THE DESCRIPTION)

1 suspension control valve arrangement
2 housing
2a elongated part of the housing 2
3 lid
4 screws
5 lever, operation mode selection means
6 operation control shaft
5,6 operation control mechanism for turning the movable valve plate 15
7 end cover, fixed to the housing 2
8 service valve, e.g. 3/3-way valve
8.1 supply valve port, first valve port, connected to supply port p1
8.2 delivery valve port, second valve port, connected to first port (dump valve supply port) 9.1 of the 3/2-way dump valve 9
8.3 exhaust valve port, third valve port, connected to the exhaust port p3 of the valve arrangement 1
9 3/2-way dump valve
9.1 dump valve supply port of the 3/2-way dump valve 9
9.2 dump valve delivery port
9.3 dump valve exhaust port
9.4 first control port, pneumatically controlled by supply pressure P0, counter-acting against pilot dump port p4
9-a dump valve passage between dump valve supply port 9.1 and dump valve delivery port 9.2
10 control piston, dump-control piston, moveable in the elongated parts 2a of the housing 2
11 control bias spring
12 sleeve inserted into the housing 2, for guiding the control piston 10 and providing sleeve ports to the piston chambers 20 and 30
12.1 sleeve port
12.21 sleeve port
12.22 sleeve port
12.3 sleeve port
14 first plate-like valve part, fixed ceramic valve plate
14-1a through-hole in the fixed ceramic valve plate 14
14-1b through-hole in the fixed ceramic valve plate 14
14-1c through-hole in the fixed ceramic valve plate 14
14-2 grooves in the fixed ceramic valve plate 14
15 second plate-like valve part, moveable or rotatable (pivotable) ceramic valve plate
15-1a through-hole in the movable ceramic valve plate 15
15-1b through-hole in the movable ceramic valve plate 15
15-1c through-hole in the movable ceramic valve plate 15
15-2 grooves in the movable ceramic valve plate 15
16 plate fixing spring, for biasing the valve plates 14 and 15 against one another
20 first piston chamber, provided circumferentially around the control piston 10
21 first suspension bellows of the rear axis
22 second suspension bellows of the rear axis
24 throttle
25 throttle ribs, extending in axial direction of the control piston 10
26 rib spaces between the throttle ribs 25, extending in axial direction of the control piston 10
29 piston sealing, for separating the piston chambers 20 and 30
30 second piston chamber, provided circumferentially around the control piston 10
32 exhaust air passage provided in the housing 2, for exhaust dump function, connecting the delivery ports p21 and p22 to the exhaust port p3
35 pneumatic suspension system of the commercial vehicle 40
40 commercial vehicle
41 rear axle of the commercial vehicle 40
A rotation axis of: the lever 5, the operation control shaft 6 and the moveable ceramic valve plate 15
B symmetry axis of the control piston 10 and the sleeve 12, movement axis of the control piston 10,
p1 supply port
p21 first delivery port, connected to suspension bellows 21
p22 second delivery port, connected to suspension bellows 22
p3 exhaust port
p4 pilot dump port
P0 supply pressure
SI blocking position of service valve 8
SII supply position of service valve 8
SIII exhaust position of service valve 8
NO normal operation status, enabling normal operation modes I, II, and III
I-III normal operation modes:
I blocking mode
II supply mode
III normal exhaust mode
IV quick-dump mode

The invention claimed is:

1. A suspension control valve arrangement (1) for a pneumatic suspension system (35) of a commercial vehicle (40), the suspension control valve arrangement (1) comprising:
a supply port (p1) configured to be connected to a supply pressure (P0);
a delivery port (p21 and p22) configured to be connected to a suspension bellows (21 and 22) of the commercial vehicle (40);
an exhaust port (p3) for exhausting air;
a housing (2), in which the ports (p1, p3, p21 and p22) are disposed;
a service valve arrangement (8) between the ports (p1, p3, p21 and p22) and switchable into different valve positions (SI, SII, SIII) including a blocking position (SI), a supply position (SII), and an exhaust position (SIII);

an operation control mechanism (5, 6) for switching the service valve arrangement (8) into one of the following normal operation modes (I, II, and III) of a normal operation status (NO):
the blocking position (SI) for a blocking mode (I) for blocking an air supply from the supply port (p1) to the delivery port (p21 and p22);
the supply position (SII) for a supply mode (II) for supplying air from the supply port (p1) to the delivery port (p21 and p22); or
the exhaust position (SIII) for a normal exhaust mode (III) for connecting the delivery port (p21 and p22) to the exhaust port (p3) via the service valve arrangement (8);
further comprising a dump-control device (7, 9, 10, 11, 12) in the housing (2) for switching between the normal operation status (NO) enabling the normal operation modes (I, II, and III) and a quick-dump mode (IV), wherein in the quick-dump mode (IV) the delivery port (p21 and p22) is connected to the exhaust port (p3) by bypassing the service valve arrangement (8);
wherein the service valve arrangement (8) comprises a first plate-like valve part (14) with at least one of the following configurations defining first channels: first grooves or first through-holes (14-1a, 14-1b, 14-1c); and
a second plate-like valve part (15) with at least one of the following configurations defining second channels: second grooves (14.2), or second through-holes (15-1a, 15-1b, and 15-1c);
wherein the first and second plate-like valve parts (14 and 15) are rotatable relatively to each other and the first and second channels define different air passages in the different valve positions (SI, SII, SIII); and
wherein the first plate-like valve part (14) and the second plate-like valve part (15) are pressed against each other by a plate fixing spring (16) without a separate additional seal between them.

2. The suspension control valve arrangement (1) according to claim 1, wherein in the quick-dump mode (IV), a higher exhaust volume rate is enabled than in the normal exhaust mode (III).

3. The suspension control valve arrangement (1) according to claim 2, wherein an air passage (9-a, 32) for bypassing the service valve arrangement (8) in the quick-dump mode (IV) comprises a larger cross-section than an internal air passage of the service valve arrangement (8) in the normal exhaust mode (III).

4. The suspension control valve arrangement (1) according to claim 1, wherein the service valve arrangement comprises a 3/3-way service valve (8) with three valve ports (8.1, 8.2, 8.3) respectively connected to one of the supply port (p1), the delivery port (p21 and p22), and the exhaust port (p3) of the housing (2).

5. The suspension control valve arrangement (1) according to claim 1, wherein the first plate-like valve part (14) is a first ceramic valve plate (14) and the second plate-like valve part (15) is a second ceramic valve plate (14).

6. The suspension control valve arrangement (1) according to claim 1, wherein the operation control mechanism (5, 6) comprises a manually operable operation control handle for an actuation by an operator, and an operation control shaft (6) drivable by the manually operable operation control handle (5) for switching the service valve arrangement (8) between the normal operation modes (I, II, and III).

7. The suspension control valve arrangement (1) according to claim 1, wherein the housing (2) is made in a single piece, comprising the supply port (p1), the delivery port (p21 and p22) and the exhaust port (p3), wherein the service valve arrangement (8) and the dump-control device (7, 9, 10, 11, 12) are arranged or configured to be disposed in the housing (2).

8. The suspension control valve arrangement (1) according to claim 1, wherein the dump-control device (7, 10, 11, 12) comprises a control piston (10) displaceable between a basic position and a dump position, wherein in the basic position, the control piston defines the normal operation status (NO), and wherein in the dump position, the control piston only defines the quick-dump mode (IV).

9. The suspension control valve arrangement (1) according to claim 8, wherein the control piston (10) is biased in the basic position by at least one of the following two biasing arrangements:
a control bias spring (11) and
a pneumatic control port (9.4) supplied with supply pressure (P0) from the supply port (p1).

10. The suspension control valve arrangement (1) according to claim 8, wherein a first piston chamber (20) is formed around the control piston (10) and/or around a peripheral surface of the control piston (10), the first piston chamber (20) being part of the service valve arrangement (8) and/or part of an internal valve air passage of the service valve arrangement (8).

11. The suspension control valve arrangement (1) according to claim 10, wherein the first piston chamber (20) is part of internal valve air passages in the supply mode (II) and/or the normal exhaust mode (III).

12. The suspension control valve arrangement (1) according to claim 11, wherein the first piston chamber (20) connects grooves (14-2) and/or through-holes (14-1a, 14-1b, 14-1c) of plate-like valve parts of the service valve arrangement (8), in particular of a fixed plate-like valve part (14), with each other, in a transversal direction with respect to a rotation axis (A) of the service valve arrangement (8).

13. The suspension control valve arrangement (1) according to claim 8, wherein the dump-control device (7, 9, 10, 11, 12) comprises a sleeve (12) inserted into the housing (2), which sleeve (12) guides the control piston (10) and provides ports (12.1, 12.21, 12,22, 12.3) to the first piston chamber (20).

14. The suspension control valve arrangement (1) according to claim 1, wherein a first delivery port (p21) and a second delivery port (p22) are provided and connected with each other, wherein a throttle (24, 25) is provided—in the supply mode (II) between the supply port (p1) and the delivery ports (p21 and p22) and/or—in the exhaust mode (III) between the exhaust port (p3) and the delivery ports (p21 and p22), wherein the throttle (24, 25) is bypassed in the quick-dump mode (IV).

15. The suspension control valve arrangement (1) according to claim 14, wherein the throttle (24) is configured as a part of the control piston (10) or in the first piston chamber (20), and the throttle is configured as at least one of:
piston ribs (25) reducing an air stream from a valve supply port (8.1), or
a sleeve supply port in fluid communication with the delivery ports (p21 and p22).

16. A pneumatic suspension system (35) of a commercial vehicle (40), comprising a suspension control valve arrangement (1) according to claim 1 associated with a rear axle (41) of the commercial vehicle (40).

17. A commercial vehicle (40) comprising a pneumatic suspension system (35) according to claim 16.

\* \* \* \* \*